United States Patent
Knaack et al.

(10) Patent No.: US 6,989,903 B2
(45) Date of Patent: Jan. 24, 2006

(54) POLARIZATION DIVERSITY DETECTOR MASK SELECTION ALGORITHM

(75) Inventors: William Christopher Knaack, West Hills, CA (US); Gregory Alan Gibbons, Thousand Oaks, CA (US)

(73) Assignee: Northrop Grumman Corporation, Woodland Hills, CA (US)

( * ) Notice: Subject to any disclaimer, the term of this patent is extended or adjusted under 35 U.S.C. 154(b) by 403 days.

(21) Appl. No.: 10/333,941

(22) PCT Filed: Jul. 24, 2001
(Under 37 CFR 1.47)

(86) PCT No.: PCT/US01/23362

§ 371 (c)(1),
(2), (4) Date: May 6, 2003

(87) PCT Pub. No.: WO02/087118

PCT Pub. Date: Oct. 31, 2002

(65) Prior Publication Data

US 2004/0068384 A1 Apr. 8, 2004

Related U.S. Application Data

(60) Provisional application No. 60/220,403, filed on Jul. 24, 2000.

(51) Int. Cl.
G01B 9/02 (2006.01)
G01B 9/10 (2006.01)

(52) U.S. Cl. .................................. 356/491; 250/227.27
(58) Field of Classification Search ................ 356/491; 250/227.19, 227.27
See application file for complete search history.

(56) References Cited

U.S. PATENT DOCUMENTS

| | | | | |
|---|---|---|---|---|
| 5,600,474 A | * | 2/1997 | Tomesen et al. | ............ 398/205 |
| 6,134,281 A | * | 10/2000 | Green et al. | ........... 250/227.27 |
| 6,825,455 B1 | * | 11/2004 | Schwarte | .................. 250/214.1 |
| 6,825,714 B2 | * | 11/2004 | Greene et al. | ............... 329/304 |
| 2004/0047640 A1 | * | 3/2004 | Knaack et al. | .............. 398/209 |

* cited by examiner

Primary Examiner—Zandra V. Smith
Assistant Examiner—Patrick Connolly
(74) Attorney, Agent, or Firm—Lynn & Lynn

(57) ABSTRACT

A method for selecting a cell from each member of a tri-cell photodetector array used to detect optical signals output from a multichannel sensor array to indicate interference between two optical signals of unknown polarization incident upon the tri-cell photodetector array comprises selecting a cell in each tri-cell photodetector and collecting a selected number of samples of the signal output for each cell. Each sample has an in-phase AC component I and a quadrature AC component Q. An amplitude sum signal $E=I*I+Q*Q$ is calculated for a predetermined number of samples in the selected number of samples of the signal output for each cell. The signal output of cell in each tri-cell photodetector having the largest value of the amplitude sum signal is selected for further processing.

11 Claims, 3 Drawing Sheets

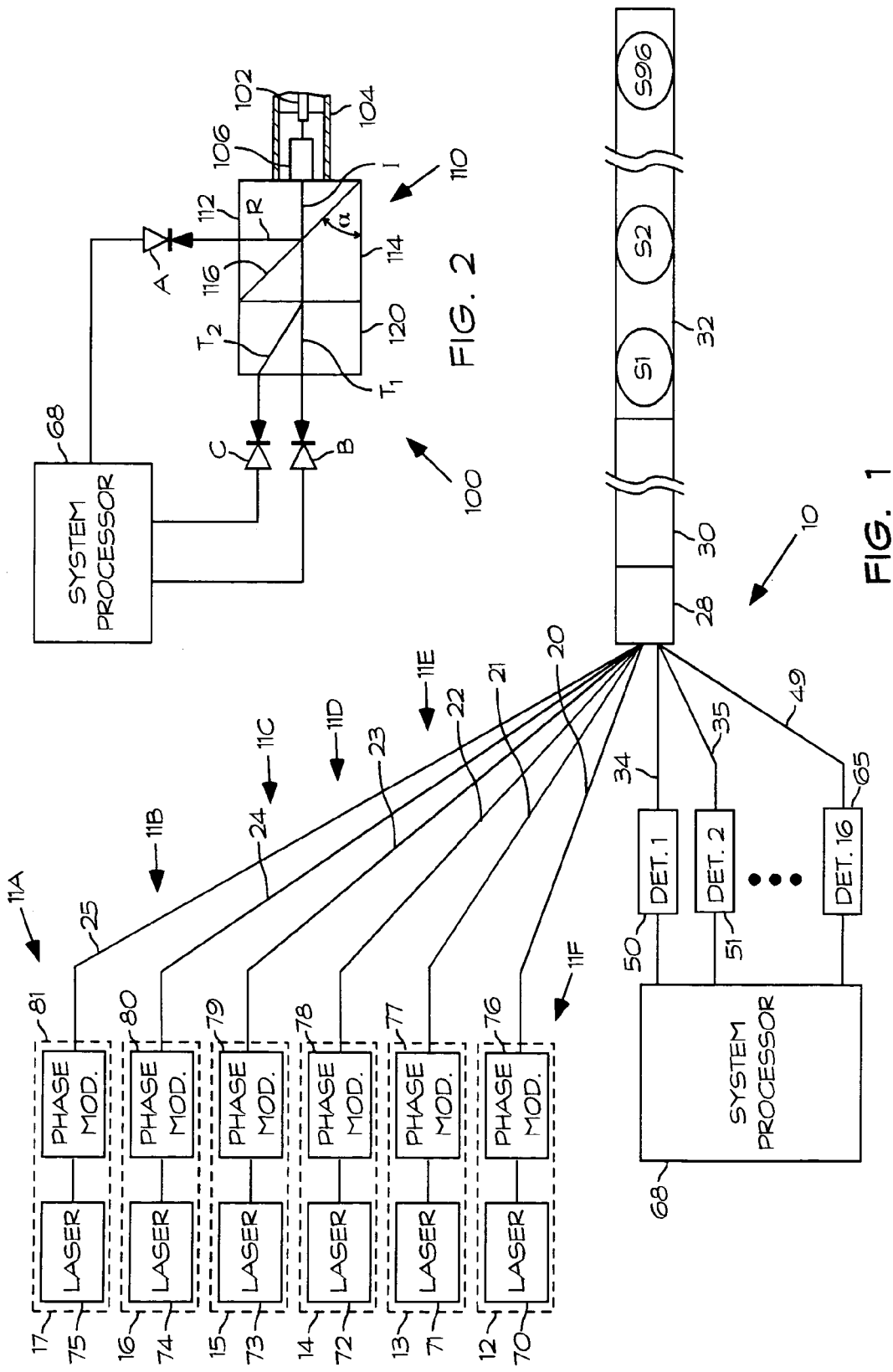

POLARIZATION DIVERSITY DETECTOR MASK SELECTION ALGORITHM

CROSS REFERENCE TO RELATED APPLICATION

Applicants claim the benefit of U.S. Provisional Application Ser. No. 60/220,403, filed Jul. 24, 2000 for Six Sigma Polarization Diversity Detector Mask Algorithm.

BACKGROUND OF THE INVENTION

This invention relates generally to optical signal receivers. This invention relates particularly to a method for minimizing polarization signal fading in an optical receiver included in a fiber optic interferometric sensor system. Still more particularly, this invention relates to a mask selection algorithm for a tri-cell polarization diversity detector that increases the probability of selecting the mask element with the largest signal for a given input.

Mismatched fiber optic interferometers are commonly used as sensing elements in fiber optic sensor arrays for measuring changes in a parameter such as fluid pressure, acceleration, magnetic field intensity, etc. Such sensing elements measure the time-varying phase delay between optical signals that have propagated along separate optical paths having unequal path length.

Mixing between a reference signal and a data signal is often necessary to extract information from an optical carrier. In interferometric sensing the mixing is typically between a reference signal and a signal whose phase has been modified, or modulated by the parameter being measured.

Modulation is commonly used to transmit information from an information source, such as a sensor system where information is detected, to an information destination, such as a receiver system where detected signals are received and processed. According to conventional modulation techniques, a signal of interest detected by a sensor modulates a carrier signal by modifying one or more characteristics of the carrier signal, such as amplitude, frequency or phase, to form a modulated carrier signal. The modulated carrier signal is then more easily transmitted over the appropriate communication channels to the destination or receiver system where the modulated carrier signal is demodulated to recover the signal of interest and determine the information.

The fiber optic sensors detect or sense signals that modulate the output phase of the sensor system or interferometer. The modulated carrier can then transmitted to a receiver system and photodetected. In a system having an array of sensors, the signals are often multiplexed, for example, using time division multiplexing (TDM) and/or wavelength division multiplexing (WDM), as well as frequency division multiplexing (FDM).

Fiber optic sensor systems acquire in the demodulation process a signal component proportional to the sine of the sensor phase shift and another signal component proportional to the cosine of the sensor phase shift. The sine of the sensor phase shift is referred to as the quadrature term, Q; and the cosine of the sensor phase shift is referred to as the in-phase term, I. The angle of the phase shift is determined by calculating the ratio I/Q, which is the arctangent of the sensor phase shift. The amplitudes of the sine and cosine terms must be set equal by a normalization procedure to ensure the accurate implementation of an arctangent routine to determine the sensor phase shift.

One type of modulation technique implemented in interferometric and other sensing systems involves the use of phase generated carriers. The time varying phase signal (signal of interest) of each sensor modulates the phase generated carriers to form modulated carriers. Both the signals of interest and the phase generated carriers can be mathematically represented as a Bessel series of harmonically related terms. During modulation, the Bessel series of the signals of interest modulates the Bessel series of the phase generated carriers. The number of terms in the Bessel series of the resulting modulated carriers will be dependent upon the amplitude of the measured or detected signal of interest. The harmonically related terms in the Bessel series of the modulated carrier represent both the measured or detected signal of interest and the carrier signal.

Typical fiber optic sensor systems using phase generated carriers to transmit a detected or measured signal (signal of interest) to a receiver system have used a pair of quadrature carriers with frequencies of either $\omega_c$ and $2\omega_c$ or $2\omega_c$ and $3\omega_c$, where $\omega_c$ is the phase generated carrier frequency. In multiplexed sensor systems, the sensor sampling frequency $f_s$ must be selected to ensure that frequencies greater than $f_s/2$ are not aliased into the band of interest below $f_s/2$.

In some systems the optical signal input to the interferometer is a phase generated carrier produced by generating time-dependent variations in the frequency of the optical signal output by a laser. A phase generated carrier may be produced by various techniques. One technique involves routing the laser source output through an external phase modulator and applying a sequence of separate and unique linear ramp voltages to the linear phase modulator to produce step changes in the optical frequency.

Another technique for producing a phase generated carrier uses sinusoidal phase modulation of the source signal. Instead of sampling signals associated with separate optical frequencies, the sampling of signals is associated with integration over portions of a period of the phase generated carrier.

Still another technique for producing a phase generated carrier involves the use of a Direct Digital Synthesizer (DDS) containing a numerically controlled oscillator (NCO). In particular, carriers that are 180° out of phase with the NCO phase will produce sensor responses with opposite sign after demodulation different than those produced by carriers that are in phase with the NCO phase in the DDS. When coherently combined, sensor responses with opposite signs will combine destructively, which results in an attenuation of the combined output and a reduction in overall system dynamic range.

A significant problem in systems that employ the reception of optical signals from an optical fiber is signal fading caused by changes in the polarization of the optical signals transmitted through the optical fiber. Specifically, phase information from two or more optical signals propagated through a fiber optic transmission line can be lost at the receiver if the polarizations of two signals of interest are crossed, resulting in no detector beat note. It is therefore necessary to provide some mechanism for treating the signal that yields a suitably large detector beat note for signal processing in all cases of polarization orientation.

Polarization diversity detectors are used to detect an optical signal of random time varying polarization and produce an electrical output corresponding to a selected polarization component in the optical signal. U.S. Pat. No. 5,852,507, which issued Dec. 22, 1998 to David B. Hall and which is assigned Litton Systems, Inc., assignee of the present invention, discloses a tri-cell polarization diversity detector that produces multiple output signals from an incident beam that has two orthogonal polarization components. The disclosure of U.S. Pat. No. 5,852,507 is incorporated by reference into the present disclosure.

U.S. Pat. No. 5,448,058, which issued Sep. 5, 1995 to Arab-Sadeghabadi and vonBierein and which is assigned Litton Systems, Inc., assignee of the present invention, discloses a polarization diversity detector that includes an array of three polarizers having axes of polarization spaced apart by selected angles such that an optical signal incident on the polarizer array has a component along at least one of the axes of polarization. A photodetector array is arranged such that each photodetector receives light from a selected one of the polarizers. At least one of the photodetectors receives parallel polarization components that form an electrical signal that indicates interference between the parallel polarization components. The disclosure of U.S. Pat. No. 5,448,058 is incorporated by reference into the present disclosure.

SUMMARY OF THE INVENTION

This invention is directed to a mask selection algorithm for a tri-cell polarization diversity detector that increases the probability of selecting the mask element with the largest AC signal amplitude for a given input. The ability to select the tri-cell mask with the largest signal present for a given input maximizes the signal to noise performance for the system for that particular input.

A method for selecting a cell from photodetector array used to detect optical signals output from a plurality of sensors arranged to indicate interference between two optical signals of unknown polarization incident upon the photodetector array comprises the steps of selecting a cell for testing and collecting a selected number of samples of the signal output for each selected cell, each sample having an in-phase component having magnitude I and a quadrature component having magnitude Q. The method further includes the step of calculating an amplitude sum value $E=I*I+Q*Q$ for a predetermined number of samples in the selected number of samples of the signal output for each selected cell. The method includes repeating the foregoing steps for each cell selected for testing and selecting the cell having the largest amplitude sum value.

The method may further comprise the step of testing the largest amplitude sum value to determine whether it is suitable for demodulation.

The method may further comprise the steps of comparing the amplitude sum signal having the largest value to a reference amplitude $A_{ref}$; and maintaining the gain in the channel containing the cell having largest amplitude sum signal if the largest amplitude sum signal is not less than the reference amplitude.

The method may further comprise the steps of comparing the largest amplitude sum signal to a selected minimum amplitude value $A_{min}$ if the largest amplitude sum signal is less than the reference amplitude and calculating a gain correction if the largest amplitude sum signal is less than the selected minimum amplitude.

The method may further comprise the step of nulling the gain in the channel containing the cell having largest amplitude sum signal if the largest amplitude sum signal is less than the selected minimum amplitude.

An appreciation of the objectives of the present invention and a more complete understanding of its structure and method of operation may be had by studying the following description of the preferred embodiment and by referring to the accompanying drawings.

BRIEF DESCRIPTION OF THE DRAWINGS

FIG. 1 illustrates a fiber optic sensor array;

FIG. 2 illustrates a polarization diversity detector that may be included in the sensor array of FIG. 1.

DETAILED DESCRIPTION OF THE INVENTION

Figure 3A:
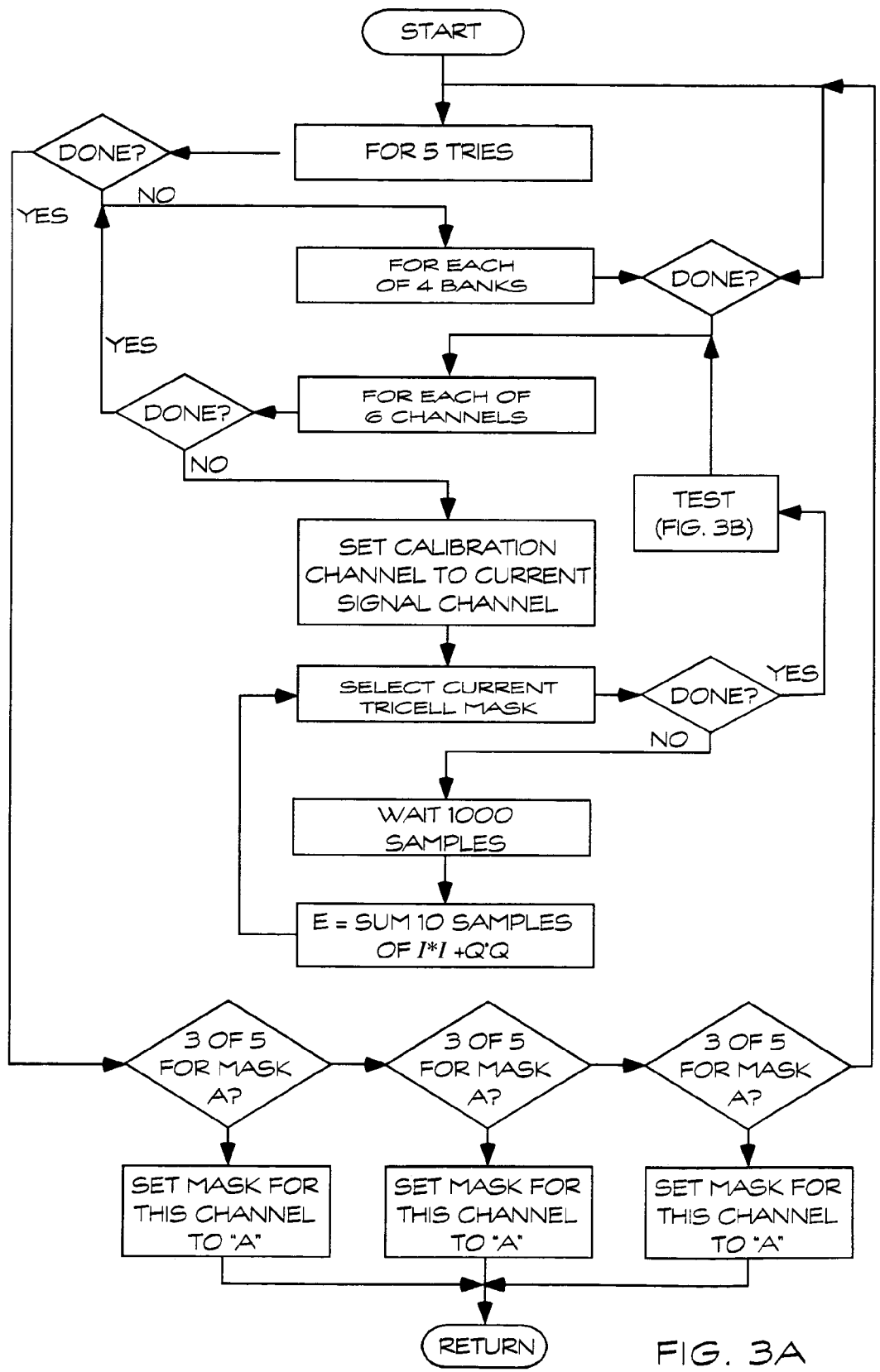
FIGS. 3a and 3B are flow diagrams of a mask selection algorithm according to the present invention for selecting the best polarization mask for each channel in the fiber optic sensor array of FIG. 1.

This invention is directed to a signal processing algorithm for processing signals output from a sensor. FIG. 1 illustrates a multi-channel fiber optic sensor architecture 10 with which the algorithm according to the present invention may be used. By way of example, FIG. 1 shows six channels 11A–11F. FIG. 2 illustrates an example of a polarization diversity detector 100 that may be used to detect optical signals output from each channel of the fiber optic sensor system 10. The algorithm according to the present invention may be used with other sensor architectures (not shown) and with other polarization diversity detectors (not shown). The particular fiber optic sensor system 10 and polarization diversity detector 100 are disclosed herein only to provide examples of such apparatus that may be used with the invention.

The fiber optic sensor system 10 is fully disclosed in U.S. patent application Ser. No. 09/429,048, filed Oct. 29, 1999 and assigned to Litton Systems, Inc., assignee of the present invention. The fiber optic sensor system 10 is also fully disclosed in U.S. patent application Ser. No. 09/430,057, filed Oct. 29, 1999 and assigned to Litton Systems, Inc. The fiber optic sensor system 10 includes a plurality of optical signal sources 12–17 arranged to supply a plurality of corresponding optical feed lines 20–25. The optical feed lines are joined at an optical terminator 28. The optical terminator 28 is connected to a downlead cable 30, which is connected to an acoustic array cable 32. The acoustic array cable 32 houses a plurality of sensors, which in this exemplary embodiment total ninety-six and are designated S1–S96. The optical terminator 28 also provides a link between the downlead cable 30 and a plurality (e.g., 16) of return fibers 34–49, which are arranged to provide optical signals to corresponding tri-cell photodetectors 50–65. The outputs of the tri-cell photodetectors 50–65 are electrically connected to a system processor 68.

The optical signal sources 12–17 include a respective laser 70–75 and a phase modulator 76–81. Each of the lasers 70–75 generates an optical signal having a different optical wavelength. The six optical signals produced by the lasers 70–75 are directed to respective phase modulators 76–81. Preferably, the phase modulators 76–81 are each characterized by a different modulation frequency. Accordingly, the optical signal sources 12–17 produce six optical signals, each having different optical wavelengths and each modulated at a separate modulation frequency.

The sensors S1–S96 may be formed as Michelson interferometers (not shown) or Mach-Zehnder interferometers (not shown) that produce interference patterns in response to changes in the parameter being monitored by the sensor array 10. For example, the parameter may be acoustic pressure or seismic vibrations. The prior art is replete with examples of such fiber optic interferometric sensors used to monitor physical parameters.

Each of the tri-cell photodetectors 56–65 may be formed as shown in FIG. 2, which illustrates a high efficiency polarization diversity detector system 100. The polarization diversity detector system 100 is fully disclosed in U.S. Pat. No. 5,852,507. The polarization diversity detector system 100 receives an optical signal from a single mode optical fiber 102 that transmits an optical signal from a suitable source (not shown), which may be a laser. The optical fiber 102 is rigidly supported within a structural support tube or ferrule 104, in a manner well-known in the art. The optical signal emerges as a beam from the proximal end of the optical fiber 102 and enters a focusing lens 106 after traversing an optical gap 108. The lens 106 is preferably a graded index lens, of the type that is commercially available from NSG America, Inc., Somerset, N.J., under the trademark "SELFOC", or the equivalent. The lens 106 focuses the optical beam in a manner to be described below. The gap 108 may be of any material, including air, which is transparent to the optical wavelength used. Preferably, the gap 108 is adjustable to assure that the optical beam enters the lens 106 with the proper amount of divergence to achieve the desired focal length for the lens.

The lens 106 is mechanically and optically coupled to a first polarizing beamsplitter 110. The first beamsplitter 110 comprises a first or input prism 112 (to which the lens 106 is coupled), and a second or output prism 114 that is coupled to the input prism 112 along a coated optical interface 116. The prisms 112, 114 are commercially available items of optical quality glass, preferably of the type marketed under the designation "BK7" by Schott Glasswerke, Mainz, Germany, or the equivalent.

The prisms 112 and 114 are preferably right-angled prisms. The optical interface between the prisms 112 and 114 forms an angle of 45° with respect to the incident optical beam I entering the first beamsplitter 110 from the lens 106. The interface 116 is optically coated to split the incident beam I into two beams, separated from each other by 90°, with different ratios of p-polarization and s-polarization of the optical signal. For this embodiment, the coating at the interface 116 is designed to achieve nearly an ideal 100% transmission of the p-polarized component of the signal, and thus nearly an ideal 0% reflection of the p-polarized component. For the s-polarized component, it is desired to achieve approximately an ideal transmission of 33%, and thus approximately an ideal reflection of 67%. Thus, the portion T of the optical signal transmitted through the interface 116 will include approximately 100% of its p-polarized component, and approximately 33% of its s-polarized component. The portion R of the optical signal reflected at the interface 116 will include almost none of its p-polarized component, and approximately 67% of its s-polarized component.

The specific coating needed to achieve the aforementioned polarization characteristics of the transmitted and reflected portions of the incident beam depends on the wavelength of the incident beam. If, for example, a nominal wavelength of 1320 nm is employed, the coating should be a quarter wave stack that comprises three layers of silicon nitride, each about 221 nm thick, alternated with two layers of silicon dioxide, each about 330 nm thick. These materials and dimensions will not achieve the ideal transmission and reflection ratios set forth above, but they will achieve sufficiently close approximations to yield useful results. It is considered to be well within the expertise of those of ordinary skill in the pertinent arts to provide specific coating compositions and thicknesses that are suitable for other wavelengths of potential interest.

The reflected portion R of the incident beam I is directed through the input prism 112, at a right angle to the transmitted portion, into a first photodetector A. The transmitted portion T passes through the output prism 114 into a uniaxial calcite crystal plate 120 that is mechanically and optically coupled to the output prism 114 so as to receive the transmitted beam portion T therethrough. The calcite crystal plate 120 functions as a second polarizing beamsplitter and provides a 45° rotation of the polarization eigenstates of the transmitted beam portion T around its axis of propagation between the two beamsplitters 110 and 120.

The calcite crystal plate 120 propagates one linear polarization of the transmitted beam portion T as an ordinary ray, and the orthogonal polarization as an extraordinary ray at an angle of about 6° to the ordinary ray. The ordinary ray exits the calcite crystal plate 120 as a first transmitted beam portion $T_1$ which enters a second photodetector B, while the extraordinary ray exits the calcite crystal plate 120 as a second transmitted beam portion $T_2$ which enters a third photodetector C.

The photodetectors A, B and C produce analog electrical signals that indicate the intensity (i.e. AC amplitude) of the optical signals R, $T_1$, and $T_2$, respectively. The optical signals output from the sensor array are subject to signal fading caused by changes in polarization. The analog signals are digitized so that they can be input to the system processor 68. The system processor 68 selects which of the photodetectors A, B or C produces the signal that will be processed to determine the sensor output. The object of the algorithm is to select the strongest signal that represents interference between optical signals for each channel in the sensor array 10. The algorithm according to the present invention processes each channel to a certain point and then decides which one to use for signal processing.

Referencing FIG. 3, the algorithm according to the present invention embeds a three-element mask selection algorithm within a voting algorithm. An inner loop 130 looks sequentially at all three mask inputs A, B, C for each of the six sensor channels 11A–11F and selects the mask that has the largest vector magnitude. An outer loop 132 accumulates the results of each single pass and selects the mask based on a majority decision for the number of passes through the algorithm.

After a start step 134, the algorithm tests for five tries 136. If five tries have not been completed, the algorithm then tests to determine if the sensors in each of four banks 138 of arrays 10 have been sampled. The algorithm proceeds with a step 140 that determines whether all six channels in each array have been sampled. After a set calibration channel to current signal channel step 142 is executed, the algorithm performs a select current tricell mask step 146. For each mask A, B, C, the algorithm has delay step 146 in which it waits for a number of samples to be collected. For example, each mask may be sampled 1000 times to obtain values of the in-phase component I and the quadrature component Q.

The array processor 68 accumulates 1000 samples for each mask and then executes a step 150 in which an amplitude sum E is calculated. The amplitude sum E is the sum of the squares of the AC amplitudes (I*I+Q*Q) of the signal output from each mask for a selected number of samples. For example, E can be the sum of ten successive samples of I*I+Q*Q for each mask, where I is the in-phase signal and Q is the quadrature signal as described above. After the selected number of samples is taken and the quantity E calculated for each mask, the largest value of E is input to a test process 152.

Figure 3B:
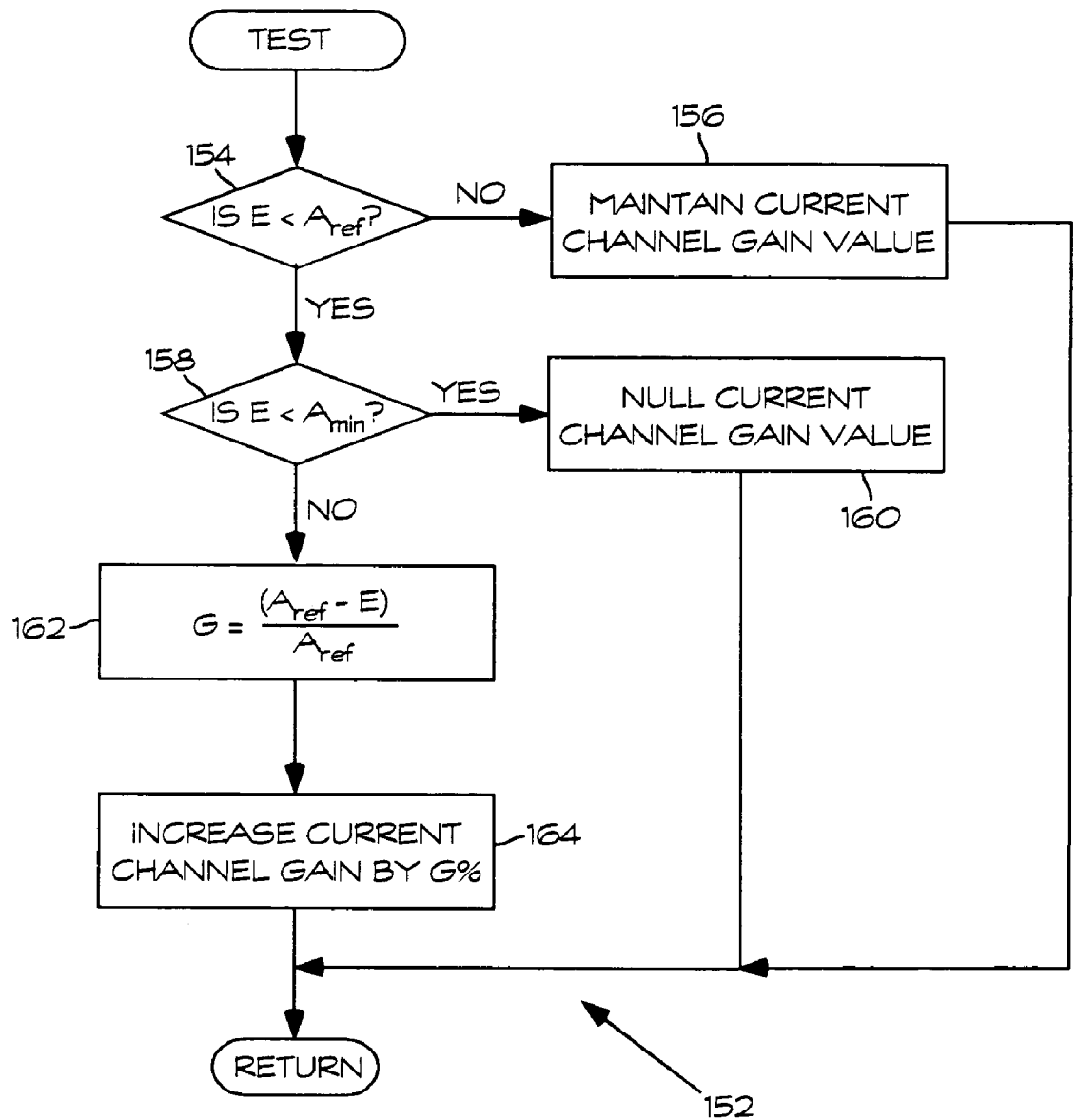

A diagram of the test process 152 is shown in FIG. 3B. The test process 152 involves determining whether the signal for the selected mask (which has the largest AC signal amplitude) has an amplitude that is suitable for demodulation. If the mask amplitude does not satisfy a minimum criteria, the system processor 68 increases the amplitude in the appropriate demodulator channel by applying a gain increase proportional to the difference between the measured AC signal amplitude of the mask and a fixed reference amplitude. If the mask amplitude falls below an absolute minimum reference, the system processor 68 nulls the gain in the appropriate demodulator channel, effectively turning off that particular channel. The purpose of this is to prevent a "screamer", which is an acoustic channel that has very little amplitude. Channels with negligible output produce extremely large arctangent results which, when coherently combined with the outputs from other channels, significantly degrade the overall signal to noise performance of the system.

The test process 152 has a first comparison step 154 that compares the selected value of E with a selected reference value $A_{ref}$. If E is not less than $A_{ref}$ then a maintain current channel gain step 156 is executed and the system processor 68 returns to the outer loop 132 If E is less than $A_{ref}$ then a second comparison step 158 compares E to a minimum acceptable value $A_{min}$. If E is less than the minimum acceptable value, then a null current channel gain value step 160 is executed. If E is not less than the minimum acceptable value, then a correction step 162 calculates a quantity $$G = \frac{A_{ref} - E}{A_{ref}}.$$

An increase current channel gain by G% step 164 is performed and then the system processor 68 returns to the outer loop 132.

For the selected tri-cell the algorithm tests each mask once per channel for six channels and then tests each of four banks of six channels for each of five tries. The algorithm then compares the results of the five tries each of the twenty-four channels. If a test step 166 indicates three or more times that the mask A has the largest value of E, a set mask step 168 for that channel selects photodetector A as the one providing the strongest signal. If a test step 170 indicates three or more times that the mask B has the largest value of E, a set mask step 172 for that channel selects photodetector B as the one providing the strongest signal. If a test step 174 indicates three or more times that the mask C has the largest value of E, a set mask step 176 for that channel selects photodetector A as the one providing the strongest signal.

The outer loop 132 has a variable index so that processor duty cycle usage (algorithm efficiency) can be traded against algorithm accuracy. Typical test results demonstrated that three passes were sufficient to insure adequate accuracy for most applications of the sensor system 10.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A method for selecting a cell from photodetector array used to detect optical signals output from a plurality of sensors arranged to indicate interference between two optical signals of unknown polarization incident upon the photodetector array, comprising the steps of:
    (a) selecting a cell for testing;
    (b) collecting a selected number of samples of the signal output for each selected cell, each sample having an in-phase component having magnitude I and a quadrature component having magnitude Q;
    (c) calculating an amplitude sum value E=I*I+Q*Q for a predetermined number of samples in the selected number of samples of the signal output for each selected cell;
    (d) repeating steps (a)–(c) for each cell selected for testing; and
    (e) selecting the cell having the largest amplitude sum value.

2. The method of claim 1, further comprising the step of testing the largest amplitude sum value to determine whether it is suitable for demodulation.

3. The method of claim 2, further comprising the steps of:
    arranging the plurality of sensors to be in a plurality of channels with each channel having a corresponding gain that controls the amplitude sum values;
    comparing the largest amplitude sum value to a reference amplitude $A_{ref}$; and
    maintaining the gain in the channel containing the cell having the largest amplitude sum value if the largest amplitude sum value is not less than the reference amplitude.

4. The method of claim 3, further comprising the steps of:
    determining whether the largest amplitude sum value is less than the reference amplitude;
    comparing the largest amplitude sum to a selected minimum amplitude value $A_{min}$ if the largest amplitude sum is less than the reference amplitude;
    calculating a gain correction $$G = \frac{A_{ref} - E}{A_{ref}}$$

if the largest amplitude sum is less than the selected minimum amplitude.

5. The method of claim 4, further comprising the step of nulling the gain in the channel containing the cell having largest amplitude sum if the largest amplitude sum is less than the selected minimum amplitude.

6. The method of claim 5, further comprising the step of:
    testing all cells in the photodetector array; and
    selecting for each photodetector the cell having the largest amplitude sum value.

7. A method for selecting a cell from members of a multicell photodetector array used to detect optical signals output from an array of sensors arranged in a plurality of channels to indicate interference between two optical signals of unknown polarization incident upon the photodetector array, comprising the steps of:
    (a) selecting a cell in of the tri-cell photodetectors;

(b) collecting a selected number of samples of the signal output for each selected cell, each sample having an in-phase component having magnitude I and a quadrature component having magnitude Q;

(c) calculating an amplitude sum for a predetermined number of samples in the selected number of samples of the signal output for each selected cell;

(d) repeating steps (a)–(c) for each cell selected for testing;

(e) selecting the cell in each multicell photodetector having the largest amplitude sum value.

8. The method of claim 7 further comprising the step of testing the amplitude sum having the largest value to determine whether it is suitable for demodulation.

9. The method of claim 7, further comprising the steps of:

comparing the amplitude sum having the largest value to a reference amplitude $A_{ref}$; and maintaining the gain in the channel containing the cell having largest amplitude sum if the largest amplitude sum is not less than the reference amplitude.

10. The method of claim 9, further comprising the steps of:

determining whether the largest amplitude sum value is less than the reference amplitude;

comparing the largest amplitude sum to a selected minimum amplitude value $A_{min}$ if the largest amplitude sum is less than the reference amplitude;

calculating a gain correction $$G = \frac{A_{ref} - E}{A_{ref}}$$

if the largest amplitude sum is less than the selected minimum amplitude.

11. The method of claim 10, further comprising the step of nulling the gain in the channel containing the cell having largest amplitude sum if the largest amplitude sum is less than the selected minimum amplitude.

* * * * *